March 10, 1959
E. J. WADE ET AL
2,877,348
LOGARITHMIC AMPLIFIER
Filed Dec. 15, 1954
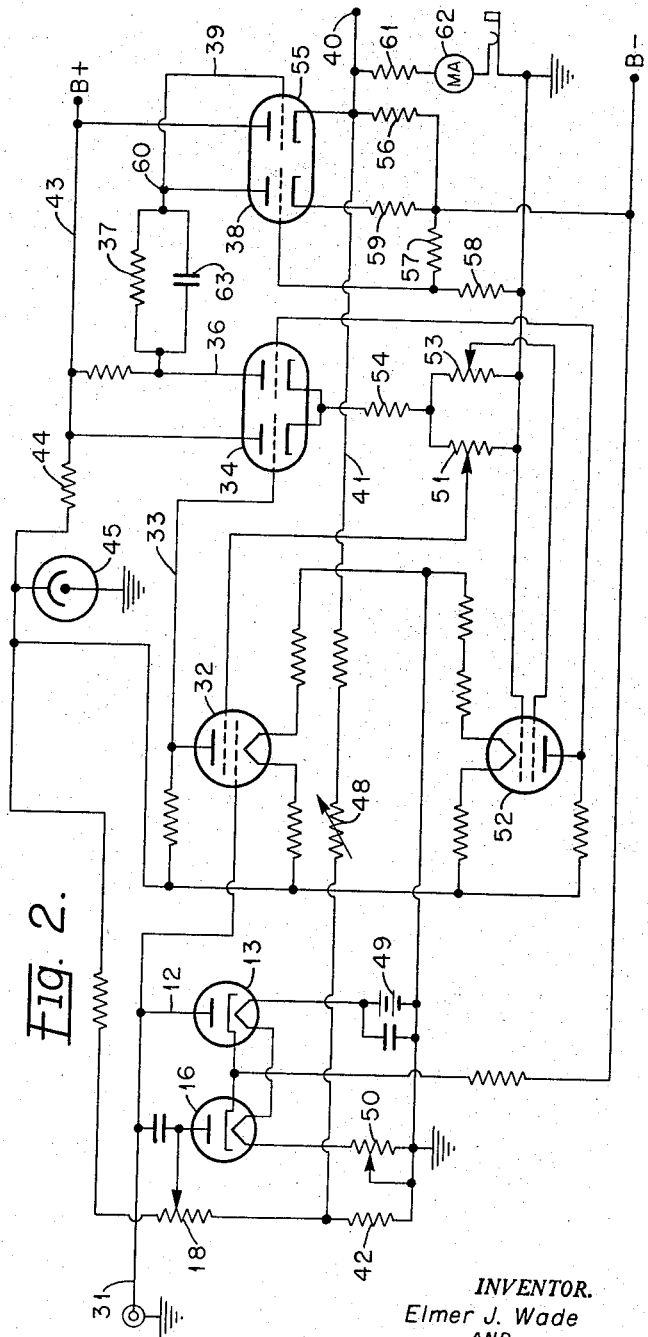
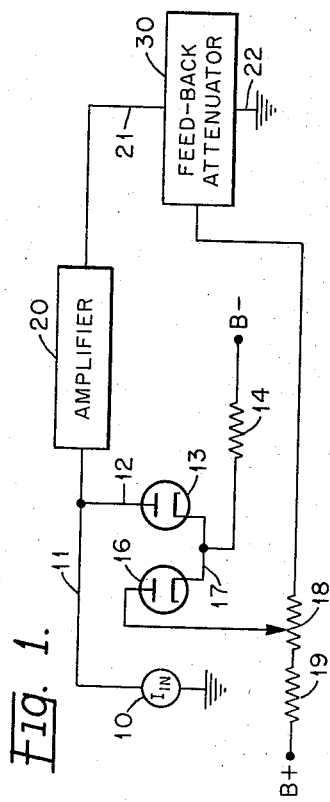
INVENTOR.
Elmer J. Wade
AND
Richard S. Stone
BY
ATTORNEY

United States Patent Office 2,877,348
Patented Mar. 10, 1959

2,877,348

LOGARITHMIC AMPLIFIER

Elmer J. Wade, Scotia, N. Y., and Richard S. Stone, San Diego, Calif., assignors to the United States of America as represented by the United States Atomic Energy Commission Application December 15, 1954, Serial No. 475,595

2 Claims. (Cl. 250—27)

The present invention relates to electronic amplifier circuits, and more especially to a logarithmic amplifier characterized by its greatly improved stability, its fast response time, and its relatively low input impedance.

An amplifier which produces an output voltage proportional to the logarithm of input current is an extremely useful device. For example, in the control of a nuclear reactor, a radiation detector placed in the reactor may furnish the input current, and the output voltage may be fed to a meter calibrated in terms of reactor power level. If the meter scale is logarithmic, then every tenfold increment in power level results in an equal increment in meter deflection. Moreover, it is known that if the output of a logarithmic amplifier is differentiated, the voltage representing the time derivative of the logarithm of the reactor flux is directly proportional to the reciprocal of the period of the reactor. Automatic control circuits have been designed which will shut down a reactor when the period becomes too short, as when the reactor power level rises too rapidly. Thus a logarithmic amplifier may provide two very useful bits of information for control of a nuclear reactor; the power level and the period. Logarithmic amplifiers have also been used in radio receivers, as automatic volume control circuits, in counting rate circuits, and in electronic computing devices.

Nuclear reactor control imposes several critical conditions not generally found in the requirements for logarithmic amplifiers designed for other uses. First, because of the potential danger involved, the amplifier must be as accurate as is possible to design, and should not drift off calibration due to filament voltage variation or tube ageing. Secondly, a low input impedance is desirable, because generally the amplifier must be connected through a long coaxial cable to the radiation detector in the reactor, in order to physically separate the electronic portion from the damaging radiations from the reactor. The leakage resistance of such cable is generally low, unless rigid specifications are followed at great expense. Therefore, in order to maintain the logarithmic characteristic, a corresponding lower amplifier input impedance is required. Thirdly, fast response time is essential, because of the very fast exponential rise in power level possible in an uncontrolled nuclear reactor. If response time is too slow, the reactor may be severely damaged before it can be shut down, should a transient of some nature cause the power level to begin to increase too rapidly.

With the knowledge of the problems of the prior art and of the shortcomings and limitations of previously designed logarithmic amplifier circuits, applicants have as an object of their invention the provision of a very accurate, fast, logarithmic amplifier having a wide range of response. Another object of their invention is to provide an amplifier characterized by a low input impedance and a fast rise time. A further object of the invention is to provide an amplifier capable of handling currents which may vary over a range of substantially 1 million and of producing an output voltage proportional to the logarithms of the magnitudes of said currents.

Other objects and advantages of the invention will become apparent from the following detailed description of a preferred embodiment thereof, when read in conjunction with the appended drawings, in which:

Figure 1 is a schematic diagram showing the novel arrangement of applicants' logarithmic amplifier, and Figure 2 is a circuit diagram of a preferred embodiment of the amplifier.

According to the present invention, means are provided to feed back the output voltage or a portion thereof to a diode in the amplifier input circuit, the diode being utilized to produce the logarithmic characteristics. The diode may preferably be stabilized by a second diode connected in series opposition therewith and having its filament operated from the same source as the filament of the logarithmic diode. A bias current of selected magnitude is continuously passed through the compensating diode, the current being large compared with the signal current. The diodes are selected such that a change in filament heating power will cause a change in the appropriate diode voltages by equal amounts. Since the tubes are connected in opposition, these changes will then cancel, so that the stability of the amplifier will be unimpaired.

Referring now to Figure 1, any suitable source of current, such as an ionization chamber in a nuclear reactor, is represented by the current generator 10. Current from this generator is coupled on lead 11 to the input of amplifier 20, the output of which is applied along lead 21 to feed-back attenuator 30. A selected portion of the output is fed back to the input lead 11 through potentiometer 18, diode 16, lead 17, diode 13, and lead 12. A large negative bias current is supplied from the B— terminal through resistor 14 and lead 17 to compensating diode 16. This current is large compared with the magnitude of the signal current, so that the signal current variations will have little or no effect on the voltage across diode 16. Therefore, the only change in that voltage will result from a change in filament temperature, such as might occur from a filament voltage change. It can be shown that under conditions of constant filament temperature, voltage drop $V_d$ across a diode operating at reduced filament voltage is given by the following equation: $V_d = a \log_{10} I + b$, where $I$ is the diode plate current and $a$ and $b$ are constants. The constant $b$ is a rapidly varying function of the filament temperature, depending in part upon the value of the diode plate current at zero voltage. Diodes can be selected which have substantially equal plate currents at zero plate voltages, utilizing the same filament supply. We have found that if two such diodes are selected and operated in series opposition from the same filament source, a change in filament heating power will cause a change in the voltage $b$ associated with each tube. Since the tubes are connected in opposition, however, changes in the voltage $b$ will be in opposite directions and will tend to cancel so as not to affect the total voltage drop across both diodes. The large constant bias current through diode 16 will make its voltage drop substantially unaffected by the additional small signal current, but the voltage drop across the logarithmic diode 13 will be determined by the magnitude of the signal current. This latter voltage drop furnishes a logarithmic signal which can be further amplified to produce the desired logarithmic output voltage.

Referring now to Figure 2, input current is received on lead 31 and applied through lead 12 to diode 13, which is coupled to diode 16 and potentiometer 18. A source of B+ potential of substantially 300 volts is supplied on lead 43 from an external source, not shown, and applied through resistor 44 to voltage regulator tube 45. This regulated voltage is applied to one end of the potentiometer 18, the other end being connected along lead 41 to the output point. Feed back attenuator 48 is provided in order to select the amount of feed back desired. The diodes are coupled to a common source of filament current 49. A filament adjusting resistor 50 in series with both filaments and the source allows the filament current to be selected.

The plate of diode 13 is applied to the control grid of electro meter tube 32, which is connected in balanced relationship with similar electrometer tube 52, the control grid of which is grounded. Outputs are taken from the plate of the electrometer tubes to the respective control grids of tube 34, which is a differential amplifier having its cathodes interconnected. Screen voltages for the electrometer tubes are obtained from cathode resistors 51, 53 of the differential amplifier, this local feed-back action tending to maintain the plate potential of tube 32 at a constant value. The negative feed back is compensated for by a local positive feed-back loop through the reference electrometer stage, so that no reduction of forward gain in the amplifier results. An output is derived from differential amplifier 34 along lead 36 and is applied through a constant current circuit, to the cathode follower 55 along lead 39. The cathodes of tubes 38, 55 are coupled to a source of negative potential B— through resistors 59, 56, respectively, while the control grid of tube 38 is tied to a point of constant potential at the junction of resistors 57, 58. Since the current through tube 38 is held essentially constant by the fixed control grid voltage and the degenerative effect of resistor 59, the voltage change on lead 36 appears only slightly attenuated on lead 39, since the current through resistor 37 is constant. Capacitor 63 is added to control the frequency response of the amplifier and increase the stability of the amplifier. The output voltage is applied through resistor 61 to meter 62, the scale of which is calibrated logarithmically, and may be further coupled to a derivative circuit, not shown, through output 40 in case the reactor period is to be measured.

Thus those skilled in the art will understand that applicants have invented a new and novel logarithmic amplifier circuit which is stable, fast in response, and characterized by low input impedance. While the circuit has been described in connection with a preferred application in reactor control, many other uses will at once suggest themselves to those skilled in the art. It is to be understood that the above preferred embodiment is to be regarded as illustrative only, and not in a limiting sense.

Having thus described our invention, we claim:

1. A logarithmic amplifier comprising an input circuit for receiving an input current, a voltage amplifier connected to said input circuit and provided with an output circuit, means defining a feed-back path between said output and input circuits comprising first and second vacuum diodes connected in series opposition, a source of filament current, means connected to energize the filaments of both diodes from the same source, and a source of bias current substantially greater than the magnitude of said input current connected to said second diode to produce a flow of current therethrough even in the absence of input current.

2. A logarithmic amplifier comprising an input circuit for receiving an input current; a first vacuum diode having its plate coupled to said input circuit; a source of energizing potential connected to provide a point of reference potential; a first amplifier tube having its control grid coupled to said input circuit and its cathode coupled to said point of reference potential; a second amplifier tube having its cathode and its control grid coupled to said point of reference potential; a third and a fourth amplifier tubes having respective cathodes coupled together, respective plates coupled to said source, and respective control grids coupled to the plates of said first and second amplifier tubes; a load resistance coupled to the plate of said fourth tube; a fifth amplifier tube having its control grid coupled to the plate of said fourth tube and its plate and cathode coupled across said source; means for deriving an output voltage from said cathode; and a feed-back network coupled from the cathode of said fifth tube to the cathode of said input diode, said network including a second vacuum diode, characterized by production of substantially the same plate current at zero plate voltage as does said first diode, coupled in series opposition with said first diode; and a source of filament potential coupled to the filaments of both said diodes.

References Cited in the file of this patent

UNITED STATES PATENTS

| | | |
|---|---|---|
| 2,194,499 | Gelzer | Mar. 26, 1940 |
| 2,247,085 | Goldman | June 24, 1941 |
| 2,557,888 | Olson | June 19, 1951 |
| 2,676,268 | Schorr | Apr. 28, 1954 |
| 2,698,914 | Tryon | Jan. 4, 1955 |
| 2,728,862 | DeBourgknecht | Dec. 27, 1955 |

OTHER REFERENCES

"Sensitive D.-C. Amplifier with A.-C. Operation," by Stewart E. Miller, Electronics, November 1941, pp. 27–31, 105–109.

De Shong, Jr.: "Logarithmic Amplifier With Fast Response," Electronics, March 1954, pp. 190–191.